United States Patent
Lynch

(10) Patent No.: US 10,145,691 B2
(45) Date of Patent: Dec. 4, 2018

(54) AMBIGUITY MAP MATCH RATING

(71) Applicant: HERE Global B.V., Eindhoven (NL)

(72) Inventor: James Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/157,542

(22) Filed: May 18, 2016

(65) Prior Publication Data
US 2017/0336214 A1  Nov. 23, 2017

(51) Int. Cl.
*G01C 21/30* (2006.01)
*G01C 21/34* (2006.01)

(52) U.S. Cl.
CPC ............ *G01C 21/30* (2013.01); *G01C 21/34* (2013.01)

(58) Field of Classification Search
USPC ........................................................ 701/446
See application file for complete search history.

(56) References Cited

U.S. PATENT DOCUMENTS

| | | | | |
|---|---|---|---|---|
| 5,394,333 A * | 2/1995 | Kao | ........ | G01C 21/30 340/990 |
| 6,526,352 B1 * | 2/2003 | Breed | ............. | G01C 21/3697 342/357.31 |
| 7,221,287 B2 * | 5/2007 | Gueziec | ............. | H04W 4/029 340/905 |
| 7,580,780 B2 | 8/2009 | Sawaki | | |
| 8,131,118 B1 * | 3/2012 | Jing | ....................... | G01C 21/20 382/305 |
| 8,781,716 B1 * | 7/2014 | Wenneman | ........ | G01C 21/3484 701/118 |
| 8,930,135 B2 * | 1/2015 | Abramovich Ettinger | ................... | G01C 21/3476 701/450 |
| 9,020,760 B2 * | 4/2015 | Fryer | ................. | G01C 21/3407 701/533 |
| 9,075,141 B2 * | 7/2015 | Syed | ...................... | G01C 21/30 |
| 9,470,534 B2 * | 10/2016 | Kesting | ................. | G01C 21/30 |
| 9,595,209 B2 * | 3/2017 | Lu | ......................... | G09B 29/106 |
| 9,683,852 B2 * | 6/2017 | Dong | .................... | G01C 21/30 |
| 9,763,055 B2 * | 9/2017 | Fan | ....................... | G06F 3/0484 |

(Continued)

FOREIGN PATENT DOCUMENTS

| | | |
|---|---|---|
| CN | 103728646 | 4/2014 |
| CN | 104833361 | 8/2015 |

OTHER PUBLICATIONS

NPL, Hunter, Timothy et al. The Path Interference Filter: Model Based Low Latency Map Matching of Probe Vehicle Data, University of California at Berkeley, Algorithmic Foundations of Robotics X, pp. 591-607, Springer Berlin Heidelberg (2013) (https://arxiv.org/pdf/1109.1966.pdf).*

(Continued)

*Primary Examiner* — Jean Paul Cass
(74) *Attorney, Agent, or Firm* — Lempia Summerfield Katz LLC

(57) ABSTRACT

Methods and apparatuses are provided for generating, using, and storing ambiguity ratings for map matching. In an embodiment, an ambiguity rating is generated using a road segment and a relationship of the road segment and other nearby road segments. The ambiguity rating may be stored in a cell based map. The ambiguity rating may be used to select an efficient map matching algorithm and provide expected map matching confidence.

19 Claims, 13 Drawing Sheets

(56) References Cited

U.S. PATENT DOCUMENTS

| | | | | |
|---|---|---|---|---|
| 2002/0161523 A1* | 10/2002 | Endo | ............... | G01S 19/22 |
| | | | | 701/469 |
| 2002/0177950 A1* | 11/2002 | Davies | ............... | G01C 21/30 |
| | | | | 701/479 |
| 2006/0136123 A1* | 6/2006 | Chinitz | ............... | G01C 21/343 |
| | | | | 701/410 |
| 2006/0200433 A1* | 9/2006 | Flinn | ............... | G06N 99/005 |
| | | | | 706/12 |
| 2006/0200435 A1* | 9/2006 | Flinn | ............... | G06N 99/005 |
| | | | | 706/12 |
| 2007/0106721 A1* | 5/2007 | Schloter | ............... | G06F 17/30864 |
| | | | | 709/200 |
| 2008/0252527 A1* | 10/2008 | Garcia | ............... | G01S 1/68 |
| | | | | 342/450 |
| 2010/0125407 A1* | 5/2010 | Cho | ............... | G01C 21/3602 |
| | | | | 701/533 |
| 2010/0256939 A1* | 10/2010 | Borenstein | ............... | G01C 21/06 |
| | | | | 702/96 |
| 2011/0125402 A1* | 5/2011 | Mitsugi | ............... | G01C 21/20 |
| | | | | 701/532 |
| 2011/0130959 A1* | 6/2011 | Hwang | ............... | G01C 21/3614 |
| | | | | 701/533 |
| 2012/0101718 A1 | 4/2012 | Lee | | |
| 2012/0224491 A1* | 9/2012 | Norair | ............... | H04L 1/0061 |
| | | | | 370/242 |
| 2013/0311038 A1* | 11/2013 | Kim | ............... | G01C 21/3641 |
| | | | | 701/36 |
| 2013/0311086 A1* | 11/2013 | Aoki | ............... | G01C 21/30 |
| | | | | 701/446 |
| 2014/0003451 A1* | 1/2014 | Wagh | ............... | H04L 41/0896 |
| | | | | 370/468 |
| 2014/0006670 A1* | 1/2014 | Wagh | ............... | G06F 13/4027 |
| | | | | 710/305 |
| 2014/0067256 A1* | 3/2014 | Aoki | ............... | G01C 21/30 |
| | | | | 701/417 |
| 2014/0114563 A1 | 4/2014 | Newson et al. | | |
| 2014/0123018 A1* | 5/2014 | Park | ............... | G06F 3/0484 |
| | | | | 715/738 |
| 2014/0307040 A1* | 10/2014 | Choi | ............... | H04W 4/046 |
| | | | | 348/14.01 |
| 2014/0350850 A1* | 11/2014 | Kmiecik | ............... | G01C 21/005 |
| | | | | 701/487 |
| 2014/0372024 A1* | 12/2014 | Lee | ............... | G01C 21/005 |
| | | | | 701/446 |
| 2015/0348412 A1* | 12/2015 | Onishi | ............... | G08G 1/096791 |
| | | | | 340/905 |
| 2016/0116292 A1* | 4/2016 | An | ............... | G01C 21/26 |
| | | | | 701/454 |
| 2016/0116299 A1* | 4/2016 | Kim | ............... | H04W 4/029 |
| | | | | 701/438 |
| 2016/0119897 A1* | 4/2016 | Kim | ............... | H04M 11/00 |
| | | | | 455/569.2 |
| 2016/0127529 A1* | 5/2016 | Kim | ............... | B60K 35/00 |
| | | | | 455/418 |
| 2016/0275190 A1* | 9/2016 | Seed | ............... | H04W 4/70 |
| 2016/0301808 A1* | 10/2016 | Choi | ............... | H04H 20/38 |
| 2017/0003396 A1* | 1/2017 | Adachi | ............... | G01S 19/39 |

OTHER PUBLICATIONS

Hunter, Timothy et al, Path and travel time inference from GPS probe vehicle data, Neural Information Processing Systems foundation (NIPS), Vancouver, Canada, Dec. 2009.*

Wang et al., Probe Vehicle Sampling for Real-Time Traffic Data Collection, Proceedings of the 8th International IEEE Conference on Intelligent Transportation Systems Vienna, Austria, Sep. 13-16, 2005.*

Wang, Zuyun et al., A Quick Map-Matching Algorithm by Using Grid Based Selecting, 2008 International Workshop on Education Technology and Training & 2008 International Workshop on Geoscience and Remote Sensing, IEEE Computer Society, Print ISBN: 978-0-7695-3563-0 (http://ieeexplore.ieee.org/document/5070158/) (08).*

Quddus, Real-Time Intelligent Map-Matching Algorithms for Advanced Transport Telematics Systems (RiMATTS), Jul. 24, 2008, Loughborough University.

* cited by examiner

AMBIGUITY MAP MATCH RATING

FIELD

The following disclosure relates to navigation devices or services.

BACKGROUND

Navigation services use positional data to locate vehicles or devices. A simple location on its own may not be useful to a user. For example, the location is matched to a digital map. Map matching is the process used to match the location to a digital map. Algorithms and software are used to associate or match the location with a known position on a map, e.g. a correct road segment.

For location data such as from the global positioning system, there exists the possibility for errors or inaccurate measurements. An accurate location determination from a global positioning service (GPS) receiver requires line of sight with GPS satellites. Satellite geometry also becomes an issue when using a GPS receiver in a vehicle, near tall buildings, or in mountainous or canyon areas. When the GPS signals are blocked from several satellites, the relative position of the remaining satellites determines how accurate the GPS position will be. As more and more of the sky is obstructed by buildings or terrain, it becomes increasingly difficult to accurately determine a position.

Another source of error is multipath. Multipath is the result of a radio signal being reflected off an object. With GPS, multipath occurs when the signal bounces off a building or terrain before reaching the GPS receiver's antenna. The signal takes longer to reach the receiver than if the signal traveled a direct path. The added time makes the GPS receiver calculate that the satellite is farther away than the satellite really is. The added time increases the potential for error in the overall position determination. Propagation delay due to atmospheric effects and internal clock errors may also affect accuracy.

Errors or inaccurate measurements for positional data may lead to incorrect map matches. Incorrect map matches may result in severe consequences for both the mapping service and an end user. One technique to limit errors is to use complex algorithms that use multiple inputs (other than just position) for map matching.

SUMMARY

In an embodiment, a method is provided for determining an ambiguity rating indicative of the potential for errors when map matching a road segment. A road segment is identified. One or more neighboring road segments are identified. A relationship between the road segment and the one or more neighboring road segments is determined. An ambiguity rating for the road segment is generated based on the relationship.

In an embodiment, a method for map matching a positional point is provided. A positional point is map matched using a first map matching algorithm to a first road segment. An ambiguity rating is determined for the first road segment. A second map matching algorithm is selected based on the ambiguity rating. The positional point is map matched to a second road segment using the second map matching algorithm.

In an embodiment, an apparatus is provided for map matching a positional point to a road segment using at least one processor and at least one memory. The apparatus is configured to identify in a plurality of geographic cells stored in the at least one memory, an ambiguity rating that relates to a geographic cell of the plurality of geographic cells, wherein the geographic cell includes the positional point. The apparatus selects a map matching algorithm for the positional point based on the ambiguity rating. The apparatus matches, the positional point to the road segment using the map matching algorithm.

In an embodiment, an apparatus is provided for storing road segment map matching ambiguity ratings using a processor and data storage operatively coupled to the processor. The apparatus includes road segment data entities stored in the data storage and accessible by the processor; wherein the road segment data entities represent locations of a road network located in a geographic region. The apparatus includes ambiguity data entities stored in the data storage and accessible by the processor, wherein each ambiguity data entity represents a map matching ambiguity rating for a respective location of the road network.

BRIEF DESCRIPTION OF THE DRAWINGS

Exemplary embodiments of the present invention are described herein with reference to the following drawings.

DETAILED DESCRIPTION

Different map matching algorithms may be used in navigation systems. A simple map matching process may match the closest spatial segment to a positional point. The simple map matching process is both efficient and straight forward. In certain scenarios, the closest spatial segment is also the correct matched segment. However, in many scenarios, there may be other segments nearby that may be slightly farther distant, but match a vehicle speed, or vehicle heading better. A simple map matching algorithm may be quick and efficient, but error prone.

In order to determine the best results, a complex map matching algorithm may be run on each positional point to generate a matched segment. Complex map matching algorithms may use additional inputs, additional processing cycles, and take additional time leading to inefficient operation in the scenarios where a simple map matching process may provide the same results. For example, a more complex map matching algorithm might involve analyzing the entire path trace which might require map matching all path points before making a decision. Additionally, even the most complex map matching algorithm does not output a clear-cut, correct answer. Further, it may not be clear that the map matched result is ambiguous.

Figure 1:
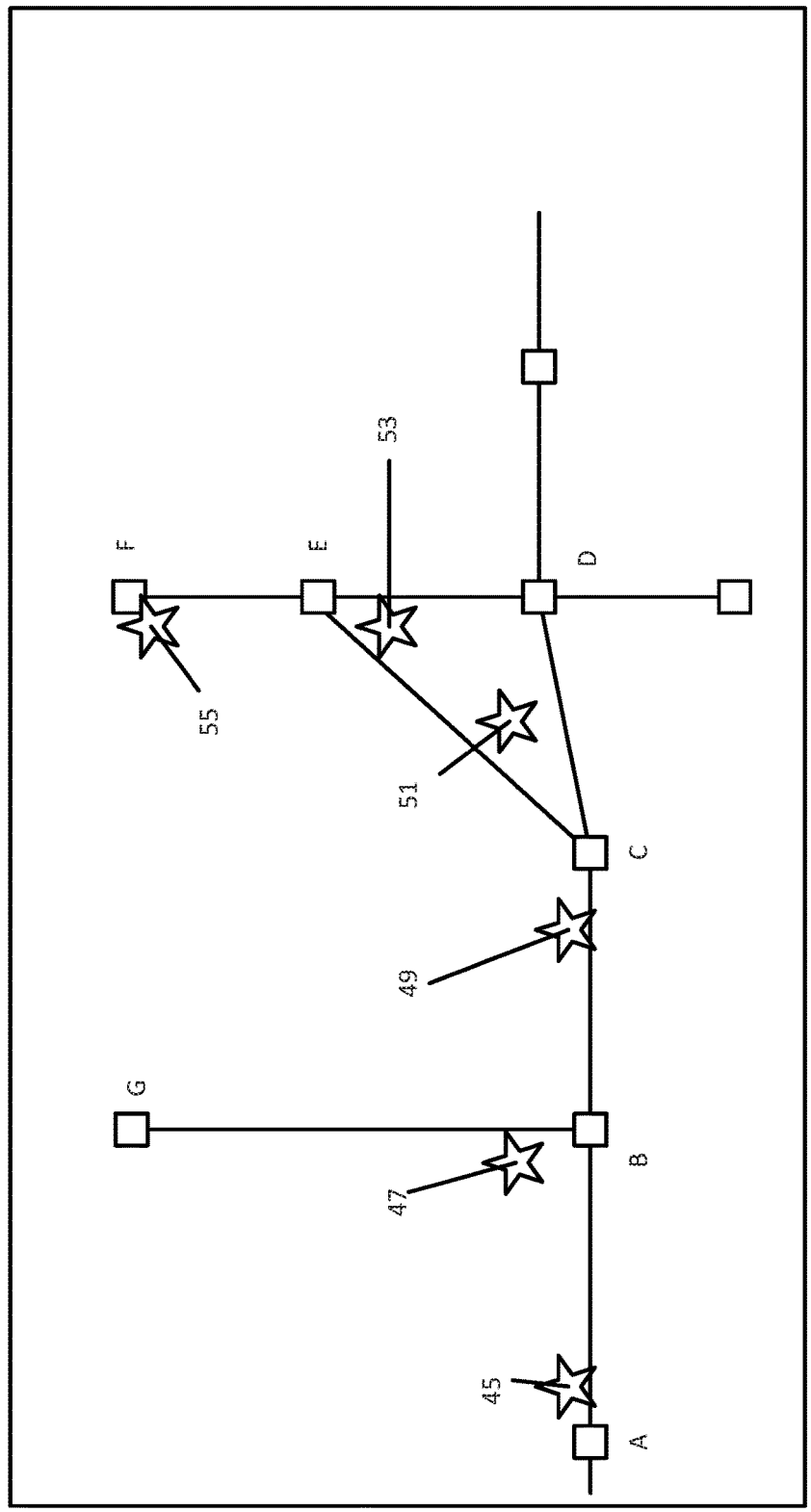
FIG. 1 illustrates an example roadway network.

FIG. 1 illustrates an example roadway network with ambiguous road segments. The roadway network includes nodes (A, B, C, D, E, F, and G) and segments connecting the nodes. The segments are designated by the nodes at either end, e.g. segment AB is the segment between nodes A and B, segment EF is the segment between nodes E and F. The stars (45, 47, 49, 51, 53, and 55) represent positional data collected by a device as the device travels the roadway network. For the example, in FIG. 1, the device travels a path including the following segments: AB-BC-CD-DE-EF. As the device traverses the path, each of the positional data points may be matched to a road segment.

As shown in FIG. 1, some positional points may not clearly line up with a road segment. For example, positional point 45 may be map matched to segment AB. From the roadway network, this is the clear choice with no alternatives. Segment AB is the only segment spatially close to the positional point. A simple map matching algorithm that matched a positional point to the closest spatial segment would be sufficient to identify the correct segment. A more complex algorithm for map matching the same positional point may spend additional processing resources and time to reach the same conclusion. For positional point 47, map matching the positional point is not as clear. Positional point 47 is closer to segment BG. A more complex map matching algorithm using additional inputs, such as heading, may identify the correct segment. A simple map matching algorithm may match the wrong segment. In certain scenarios, neither a simple map matching algorithm nor a complex map matching algorithm may be able to confidently match a road segment. For positional point 51, a simple map matching algorithm may match the positional point 51 to the closest segment CE. A more complex map matching algorithm, using heading for example, may match positional point 51 to either CE or CD. Even additional inputs such as prior segments or subsequent segments may not assist a map matching algorithm in determining the correct segment for positional point 51.

For FIG. 1, a device traveling the roadway network may operate efficiently when using different map matching algorithms. In order to map match efficiently, the device may identify when to use a more complex algorithm or when a map match is ambiguous. For the first positional point 45, a complex map matching algorithm may be a waste of resources. For the positional point 47, a simple map matching algorithm may not identify the correct segment. For the positional point 51, neither map matching algorithm may be able to return the correct segment with high confidence. For positional point 51, the device may identify that any matched segment may be suspect and alert a driver. Vehicular systems that rely on an identified segment may be adjusted to handle the ambiguity.

Figure 2:
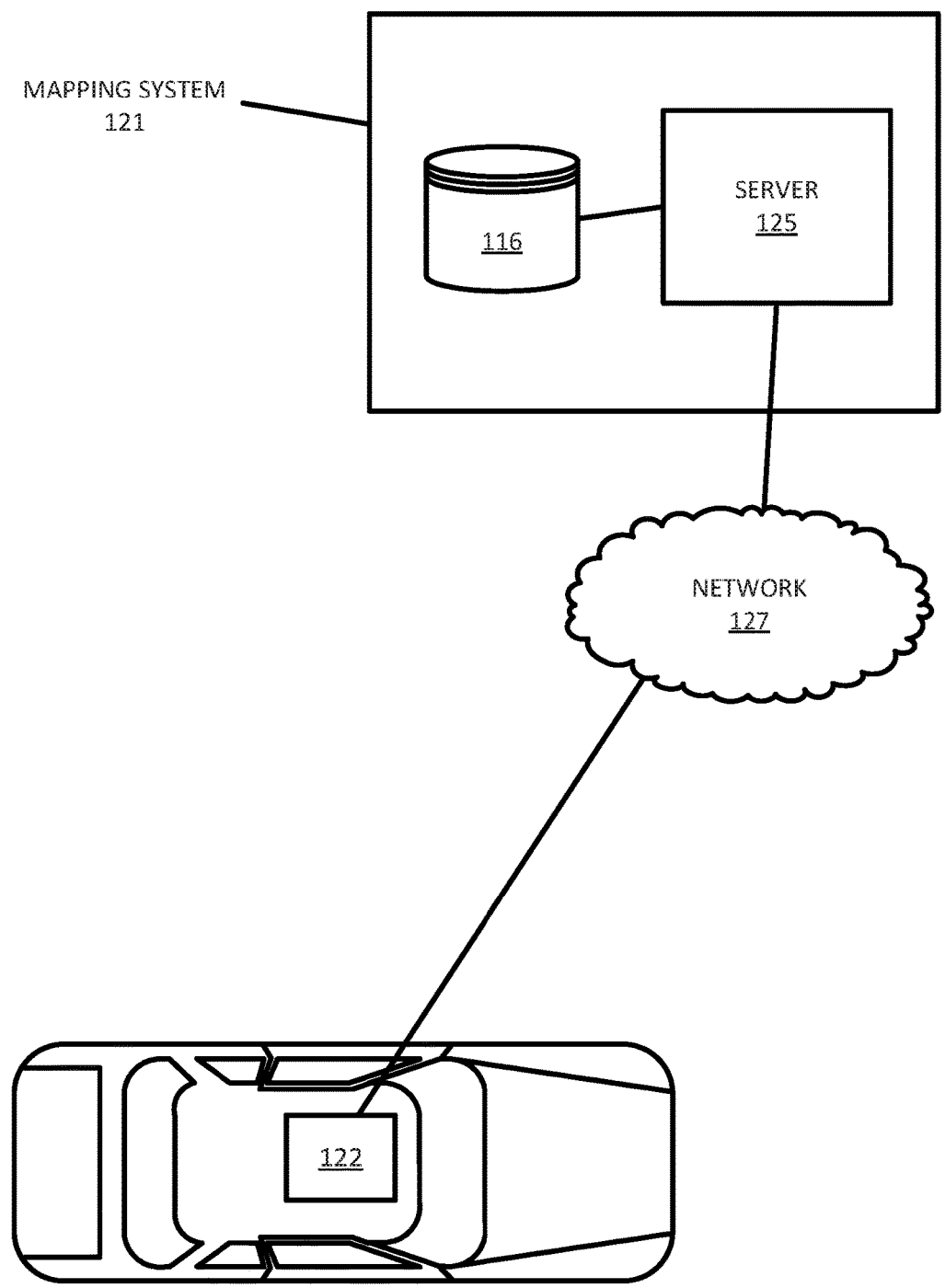
FIG. 2 illustrates an example system for generating ambiguity ratings.

Embodiments herein relate to systems and methods for generating ambiguity ratings for road segments/links and using the ambiguity ratings to select an appropriate map matching algorithm. A road segment and neighboring road segments are identified. An ambiguity rating is generated from a relationship between the road segment and neighboring road segments. An ambiguity rating may be used to identify a level or type of map matching algorithm used FIG. 2 illustrates an example system for generating ambiguity ratings and selecting a map matching algorithm for road segments. The system includes one or more devices 122, a network 127, and a mapping system 121. The mapping system 121 may include a database 116 (also referred to as a geographic database 116 or map database 116) and a server 125. Additional, different, or fewer components may be included.

The mapping system 121 may include multiple servers, workstations, databases, and other machines connected together and maintained by a map developer. The mapping system 121 may be configured to determine ambiguity ratings for a plurality of road segments. The mapping system 121 may also be configured to generate routes or paths between two points (nodes) on a stored map. The mapping system 121 may be configured to provide up to date information including ambiguity ratings and maps to external geographic databases or mapping applications. The mapping system 121 may be configured to encode or decode map or geographic data. The ambiguity ratings may be stored by the mapping system 121 in the geographic database 116 as link, segment, or node attributes.

In order to provide navigation-related features and functions to the end user, the mapping system 121 uses the geographic database 116. The geographic database 116 includes information about one or more geographic regions. The geographic database 116 may include information for pedestrian areas, indoor areas, and outdoor areas among others.

The geographic database 116 may be maintained by a content provider (e.g., a map developer). By way of example, the map developer may collect geographic data to generate and enhance the geographic database 116. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The geographic database 116 is connected to the server 125.

The geographic database 116 and the data stored within the geographic database 116 may be licensed or delivered on-demand. Other navigational services or traffic server providers may access the traffic data and the ambiguity ratings stored in the geographic database 116. Data including the ambiguity ratings data for a segment may be broadcast as a service.

The server 125 may be a host for a website or web service such as a mapping service and/or a navigation service. The mapping service may provide maps generated from the geographic data of the database 116, and the navigation service may generate routing or other directions from the geographic data of the database 116. The mapping service may also provide information generated from attribute data included in the database 116. The server 125 may also provide historical, future, recent or current traffic conditions for the links, segments, paths, or routes using historical, recent, or real time collected data. The server 125 may be configured to analyze a roadway network to determine an ambiguity rating for segments or links or geographic areas. The server 125 may be configured to analyze data from segments and links to determine correlations between similar types of segments and nodes. For example, segments with similar road types may have similar ambiguity ratings or traffic patterns.

The server 125 is connected to the network 127. The server 125 may receive or transmit data through the network 127. The server 125 may also transmit paths, routes, or ambiguity rating data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The one or more devices 122 may include probe devices, probe sensors, or other devices 122 such as personal navigation devices 122 or connected vehicles. The device 122 may include or store a copy of the geographic database 116 or a copy of a piece of the geographic database 116. The server 125 may communicate with the devices 122 through the network 127, e.g. to update the geographic database 116. The server 125 may also receive data from one or more systems or services that may be used to for navigational services. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may run specialized application that provide navigational services using positional data and the geographic database 116. The devices 122 may also be integrated in or with a vehicle. One or more map matching algorithms or applications may be stored in the device 122. The device 122 may be configured to identify an ambiguity rating of a road segment and select a map matching algorithm. The device 122 may be configured to determine a confidence level for a map matched positional data point.

Sensor data may be collected by one or more sensors, such as an optical detector (e.g., camera, light detection and ranging (LiDAR), or radar device). The devices 122 and/or other sensor(s) may report the quantity, frequency, and/or speed of vehicles as the devices 122 travel roadways. The road segment or link may be determined based on the geographical coordinates of the probe (e.g. using a GPS receiver).

Figure 3:
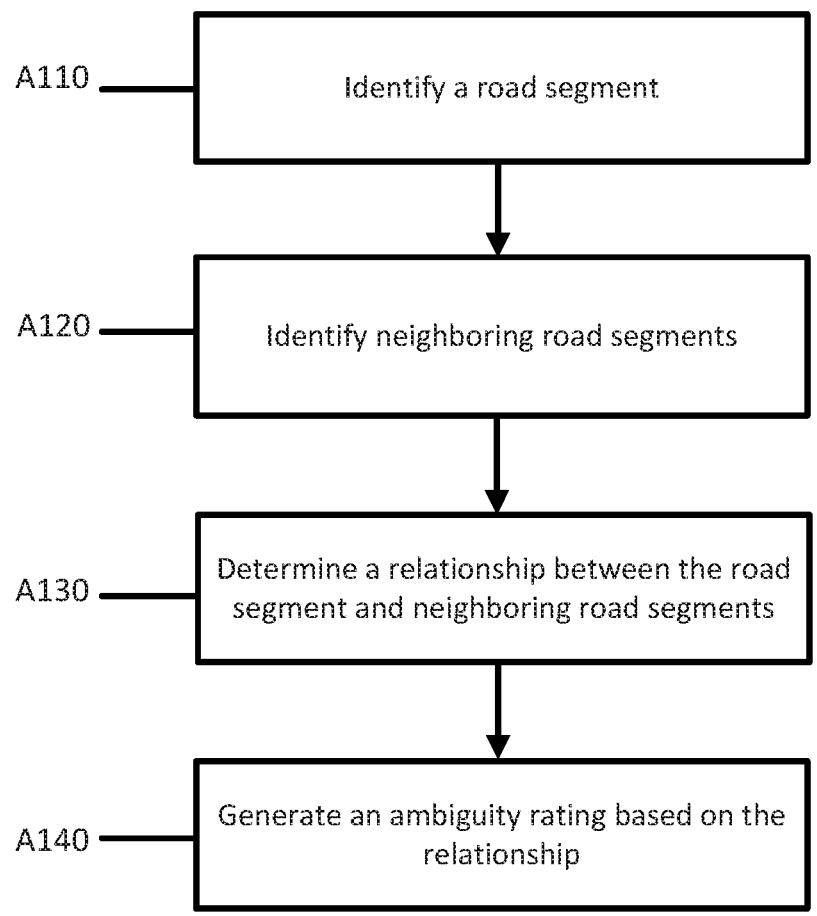
FIG. 3 illustrates an example flowchart for generating ambiguity ratings using the system of FIG. 2.

FIG. 3 illustrates an example flowchart for generating ambiguity values that indicate the probability of an ambiguous map match. An ambiguity value may be calculated for each road segment or area based on a proximate number of segments, orientation of segments, and network connectivity of segments. The ambiguity values are used to determine which algorithm should be used for each map-matched point and provides a confidence value for the map-match result. As presented in the following sections, the acts may be performed using any combination of the components indicated in FIG. 1, FIG. 7, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, a road segment is identified. A road segment may be stored in the geographic database 116. A road segment may be identified or selected by the mapping system 121, the server 125 or the device 122. The road segment may be located in a geographic region.

Figure 4:
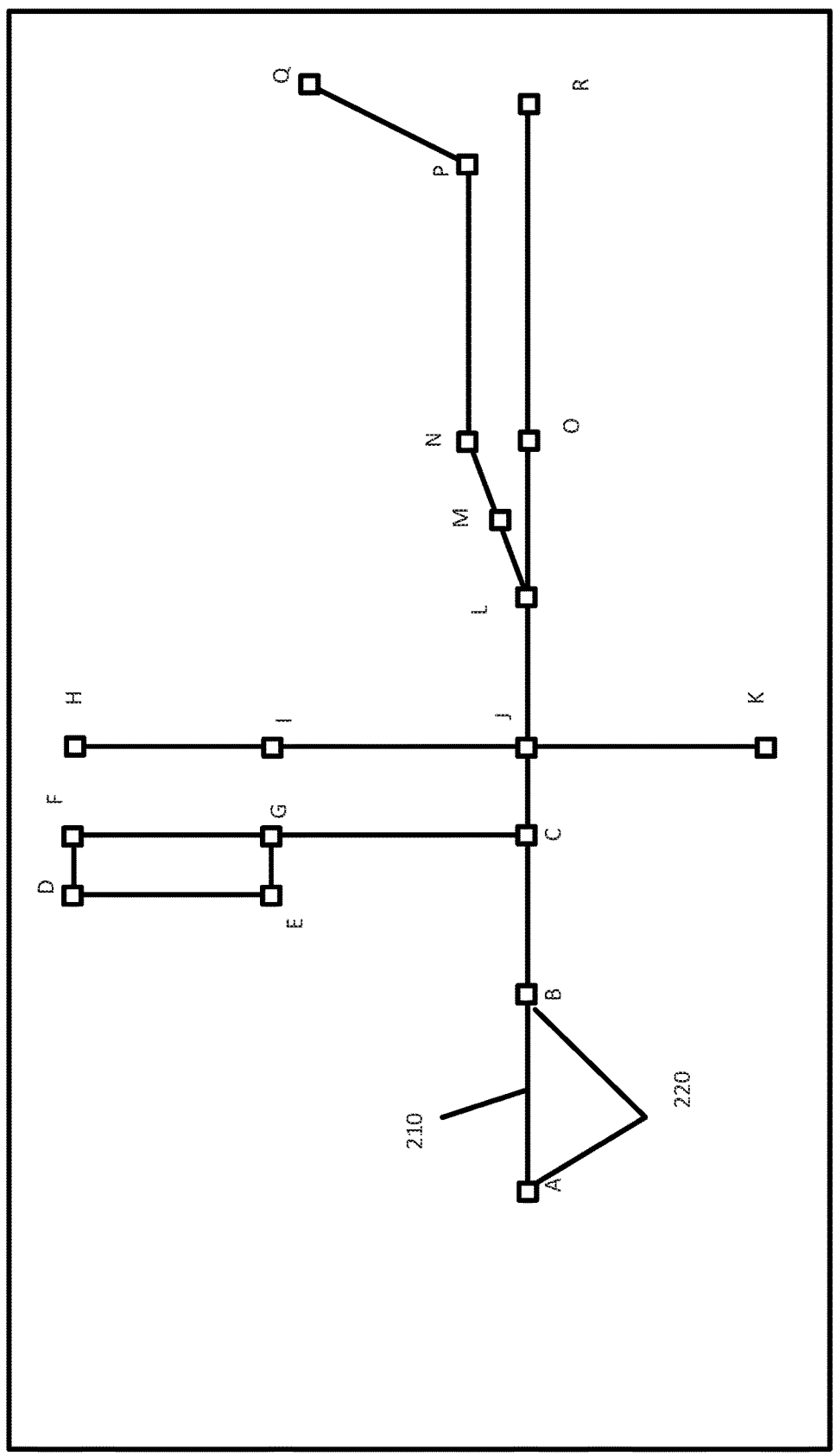
FIG. 4 illustrates an example map of a geographic region.

FIG. 4 illustrates a map of a geographic region. The geographic region may correspond to a metropolitan or rural area, a state, a country, or combinations thereof, or any other area. Located in the geographic region are physical geographic features, such as roads, points of interest (including businesses, municipal facilities, etc.), lakes, rivers, railroads, municipalities, etc. FIG. 4 further depicts a road network in the geographic region. The road network includes, among other things, roads and intersections located in the geographic region. Each road in the geographic region is composed of one or more road segments 210. A road segment 210 represents a portion of the road. Each road segment e.g. AB is shown to have two nodes 220 (A and B); one node 220 represents the point at one end of the road segment and the other node 220 represents the point at the other end of the road segment. The node A at either end of a road segment AB may correspond to a location at which the road meets another road, i.e., an intersection, or where the road dead-ends. In certain embodiments, the road segment may refer to a link in a pedestrian or indoor area. The road segment may also refer to links for other modes of transportation such as mass transit, trains, watercraft, or aircraft among others. Any segment or link between nodes in a geographic database 122 may be used.

At act A120, one or more neighboring road segments are identified. A neighboring road segment may include road segments that are adjacent, for example road segments that share a node with the road segment identified in act A110. A neighboring road segments may include road segment within a threshold distance. For example, each road segment within a fifty meter range from any point on the road segment identified in act A110 may be a neighboring road segment.

FIG. 4 illustrates neighboring road segments. For example, for segment AB, a segment BC may be identified as a neighboring road segment as segment BC shares a node with segment AB. In another example, the neighboring road segments for HI may include segments FG or IJ. IJ shares a node with HI, FG may be within a threshold distance. A threshold distance may be representative of an error range of a GPS receiver. For example, a typical error range may be 25 meters. A threshold distance may be other distances such as 10 meters, 50 meters, or 100 meters among others. In certain embodiments, more than one set of neighboring road segments may be identified. For example, if using a threshold distance, two sets, one including road segments in the range of a first threshold distance and a second set at a larger threshold distance may be identified. Certain geographic areas such as in a downtown area may exhibit larger GPS errors. In another example from FIG. 4 the neighboring segments for FG may be HI, DE, IE (using a threshold distance) and FD, GE, and GC (sharing a node).

At act A130, the relationship between the road segment and the one or more neighboring road segments is determined. In FIG. 4, segment BC is a neighboring segment to AB. A relationship between the two segments may be described in multiple terms. Segments AB and BC share a node (adjacent). In FIG. 4, the neighboring segments for FG may be HI, DE, IE, FD, GE, and GC. Each of these neighboring segments has a relationship with FG. For example, segment HI is parallel with FG but does not share a node. Segment FD is perpendicular and shares a node with FG. Segment GE is perpendicular to FG and shares a node that is a three way intersection. The segments HI and DE are both parallel to FG, but are different distances away. Each of these relationships may describe potential errors in map matching that may be present if segment FG is selected as a match for a positional point. Another way to describe the relationships is the potential for a mismatch. GE has a high level of potential to be a mismatch when FG is selected as GE is adjacent to FG and is connected to FG through an intersection. If for example, JK was identified as a neighboring segment, the relationship may only be based on a distance (the distance being further than, for example, the distance between FG and IJ). Other types of relationships between two road segments may include when a roadway splits into two (segments LM and LO) including the angle between the segments.

Additional attributes such as road type may be stored in the database 116. The relationships between two road segments may be identified through the attributes. Certain types of roads have specific relationships such as, for example, a freeway and an on-ramp. Certain roads may have multiple lanes that may each be a separate road segment. Roads may be single directional or bi-directional. Certain roadways may be wider or narrower than other roads. The height of the roadway may be used. For example, a road may tunnel underneath or pass over another roadway. The angle of cross roads or the type of turns allowed on a road may assist in defining the relationships.

At act A140, an ambiguity rating for the road segment is generated based on the relationships. An ambiguity rating may be indicative of the potential that a road segment is the wrong match for a map matching algorithm. For example, a low ambiguity rating may indicate that the road segment when matched is likely to be the correct road segment. A high ambiguity rating may indicate that a matched road segment is suspect or has the potential to be incorrectly map matched. The ambiguity rating might be a penalty value that is the sum of ambiguous situations. Different situations are weighted with a different penalty value. A value of zero indicates that there is no ambiguity and only one segment exists in the general area; the map-match result will have a high reliability. For a crossing road (perpendicular), a value of 0.5 might be added. 0.5 is a small value as heading might be used to help reduce ambiguity. For a parallel road, 1.0 might be added. A parallel road segment is more complex as heading may not help clarify the situation. However, a path history might help with the map matching.

In certain embodiments, the ambiguity rating is segment based. A rating may be assigned to each road segment. In certain embodiments, a value is assigned for each relationship that the road segment has with the neighboring road segments. The ambiguity rating may be the sum of the total of all neighboring road segments. One schema may include the following values: 0.5 for each crossing road or segment connected to the segment (number of connected segments); 0.1 for each segment in the general vicinity, regardless of orientation; 1.0 for each parallel road (same direction within general vicinity that overlap some piece of the segment); 2.0 for each parallel connected split (e.g. ramp, access road connection with similar heading); and 0.5 for segments near intersections. Other relationships and attributes for a road segment may also be given values, e.g. lanes etc. Road segments with multiple lanes in a single direction may have higher ambiguity values as alternative road segments may be closer than, for example, a separate distinct roadway. In certain embodiments, the ambiguity ratings are assigned to sub-segments. For example, each ten meter portion of a road segment may be assigned an ambiguity rating. The ambiguity rating may vary along the distance of a segment. For example, the ends of a road segment may have a higher rating than the middle of the segment.

In certain embodiments, the ambiguity rating might be a result of analysis of how each algorithm type performs in each situation. An ambiguity rating might include a single value per segment; 1.0 may indicate that algorithm (A) functions best. A rating of 2.0 might indicate algorithm (B) functions best. An ambiguity rating may be a set of multiple values indicating a likelihood success for each algorithm; a segment might have an "A" rating of 0.5 and a "B" rating of 0.9, indicating that algorithm (A) is only 50% successful in the situation and algorithm (B) is 90% successful in the segments situation.

Figure 5A:
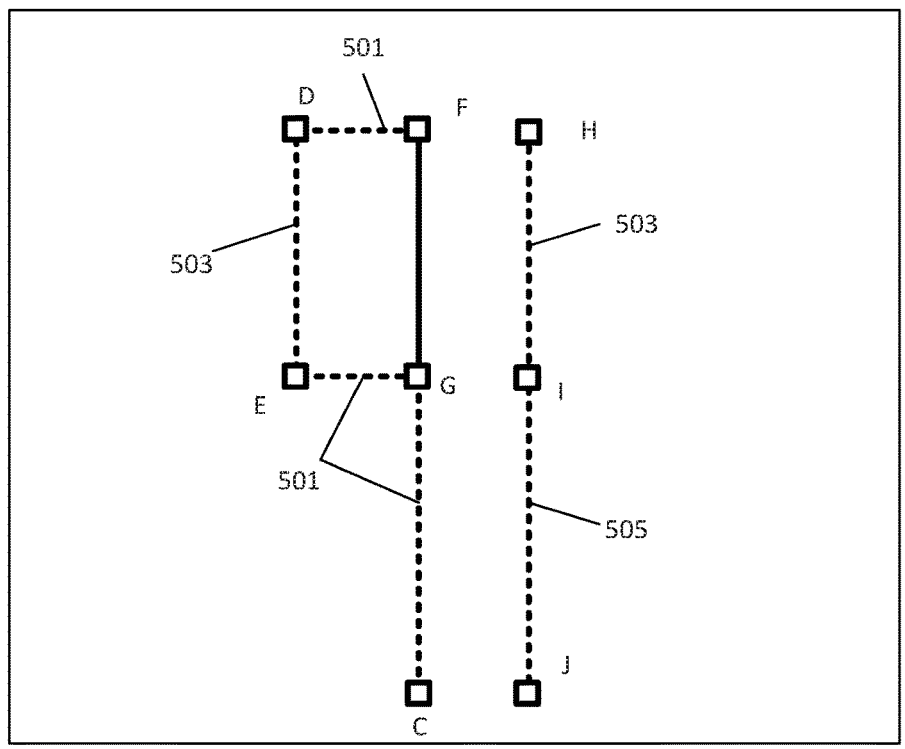
FIGS. 5A and 5B illustrate an example of ambiguity ratings that are segment based.
Figure 5B:
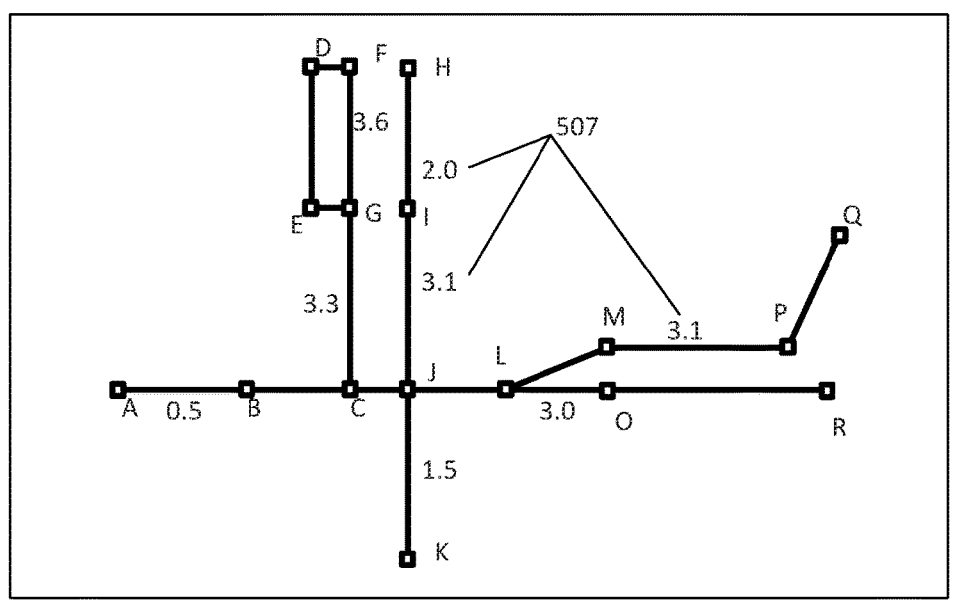

FIG. 5A and FIG. 5B illustrate ambiguity ratings that are segment based. For each segment, a rating may be assigned. The ambiguity ratings in FIGS. 5A and 5B are based on the relationship scoring described above. FIG. 5A illustrates example segment FG and how the ambiguity rating is calculated. For example, segment FG may have an ambiguity rating of 3.6. As shown, there are three connected road segments 501 (FD, GE, and GC). There are two parallel overlapping road segments 503 within the general vicinity of the road segment (HI, and DE). There is also another segment 505 in the general vicinity (IJ) that is not connected nor overlapping and parallel. Calculating the total ambiguity score for road segment FG gives a total of 3.6 (3×0.5+2×1.0+1×0.1). In another example, segment MP may have an ambiguity rating of 3.1. There is a parallel connected split (OR), two connected road segments (ML, PQ) and one additional segment in the vicinity (LO). Calculating the total ambiguity score for road segment MP generates a total of 3.1 (1×2.0+2×0.5+1×0.1). In another example, road segment AB may have an ambiguity rating of 0.5. There is only one connection shown (BC). For each of these three examples, (FG, MP and AB) the ambiguity ratings relate to the possibility that a map match is ambiguous. If a map matcher matches a positional data point to the segment FG there is a chance that the map matcher has matched the wrong segment. For a positional data point matched to segment AB, there is less chance (0.5<3.6) that the map matcher has made an error.

FIG. 5B illustrates a map of ambiguity ratings. Segment FG has an ambiguity rating of 3.6. AB has an ambiguity rating of 0.5. MP has an ambiguity rating of 3.1. The ambiguity ratings 507 are not shown in FIG. 5B for each road segment. The ambiguity ratings for each segment may be stored as an attribute in the geographic database 116. The ambiguity ratings may be altered or updated as the roadway changes or more information is collected. The ambiguity ratings may be displayed using highlighted segments or different colors.

In certain embodiments, the ambiguity ratings may be generated on a scale from, for example, 0 to 100. The least ambiguous road segments may be assigned a low score on the scale, an ambiguous road segment receiving a high score. Other scoring systems may be used. For example, a simple no ambiguity, low ambiguity, medium ambiguity, high ambiguity attribute may be stored with each road segment. A binary, ambiguous or not ambiguous rating system may be used. An ambiguity rating may be related to one or more map matching algorithms. A low ambiguity rating of (for example, using the scoring system in FIGS. 5A and 5B) 0.5 to 1.5 may indicate low ambiguity and may indicate that a simple map matching algorithm may be sufficient. An ambiguity rating of 1.5 to 2.5 may indicate that a map matching algorithm that uses heading may be sufficient. An ambiguity rating of 2.5 to 4 may indicate that a complex map matching algorithm may be required. An ambiguity rating above 4 may indicate that the roadway network is ambiguous at that point to not allow for a high level of confidence regardless of the complexity that a map matching algorithm used.

In certain embodiments, multiple sets of ambiguity ratings may be generated and stored in the database 116. For example, specific map matching algorithms may perform better for certain types of roadways. One map matching algorithm may be designed to work more efficiently with roads with multiple lanes. An ambiguity rating system for such an algorithm may have lower scores calculated for road segments with multiple lanes. Different geographic regions may have different scoring methods. Different modes of transportation, such as walking or biking may have different scoring methods.

In certain embodiments, an ambiguity rating is grid based. A grid based system divides a geographic area into areas that are then assigned an ambiguity rating. The areas may be, for example, 10 meters by 10 meters. The areas may have an adaptive size and be smaller or larger, for example a KD tree. The areas might include a multi-level, pyramidal level of detail structure (e.g. level 0 is the entire world, level 1 is level 0 split into quadrants, and so on), The ambiguity rating in a grid based system may be a spatial rating (such as a heat map) that indicates the possibility of an ambiguous set of road segments for a particular grid square.

Figure 6A:
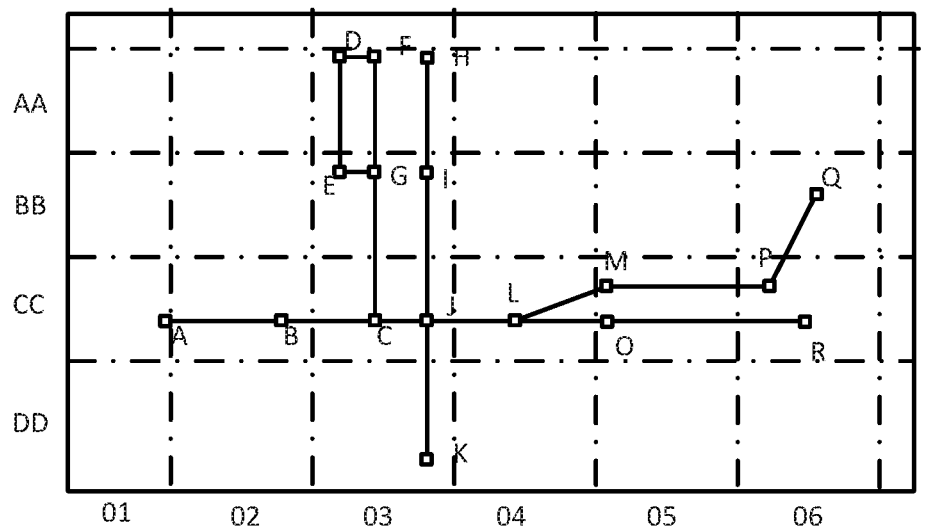
FIGS. 6A and 6B illustrate an example of ambiguity ratings that are grid based.

FIG. 6A illustrates a grid based ambiguity rating map. The roadway network from FIG. 4 is divided into square areas by the dashed lines. The square areas may be identified by the rows (AA,BB,CC,DD) and the columns (01,02,03,04,05, 06). Each square may be given an identifier such as AA01 or CC03. An ambiguity rating is calculated for each individual square. The grid based rating may be based on the number of segments in each grid and the relationship between the segments. For example, in one rating schema the ambiguity ratings are generated using the following acts. The number (NL) of segments in each grid is determined. The number of parallel segments (NP) in each grid are determined. Using NL and NP, a grid ambiguity rating is calculated with the equation: $X*NL+Y*NP$ where X and Y are weighting factors. For example, using no weighting factors (e.g. X and Y are set to 1), the ambiguity score for the square CC02 is calculated by adding the number of segments (NL=2) and the number of parallel segments (NP=0). The ambiguity rating for CC02 is 2. For grid BB03 the ambiguity score is calculated by adding the number of segments (NL=6) and the number of parallel segments (NP=3) as shown—DE/FG, FG/HI, and GC, IJ. The calculated rating for BB03 is 9.

Figure 6B:
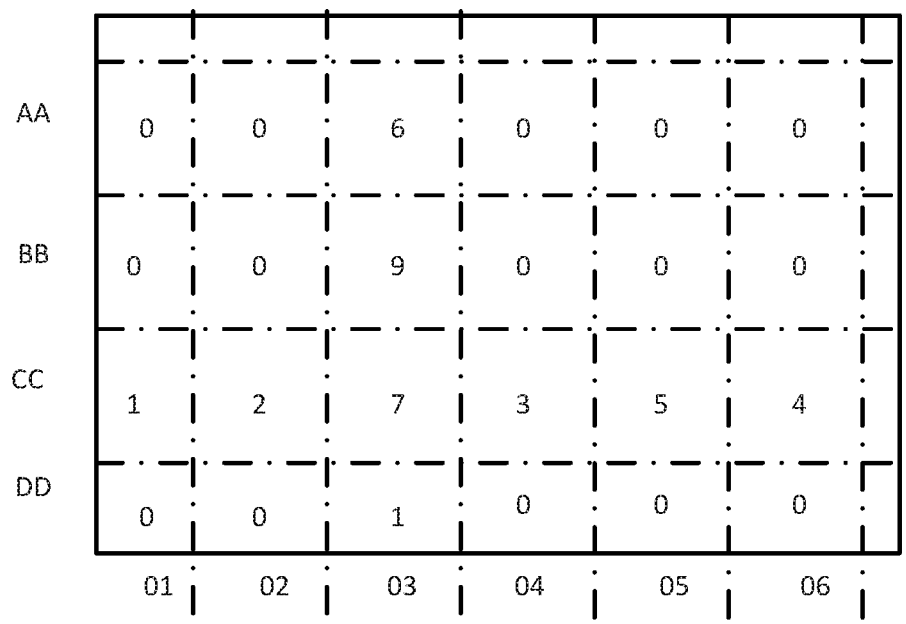

FIG. 6B illustrates a map of grid based ambiguity ratings. The ambiguity ratings are shown over the grid. For example, for the area BB03, an ambiguity rating of 9 is shown. To use the grid based ambiguity rating map, a positional point is acquired and located in the map. The positional point may be located using latitude and longitude embedded in the grid based ambiguity rating map. A zero score indicates no road segments are located in the area. In certain embodiments, the areas with a zero score may return a high ambiguity rating as there are no clear road segments to match to.

Additional or alternative variables may be used. Other variables, such as segment chains, lanes, road types, or distance between road segments among others, may be used to calculate a grid ambiguity rating. A simple scoring system such as only counting the total number of segments in an area may be used. The grid system used may not be a square grid. Other possible areas, such as rectangles or triangles may be used.

A grid based ambiguity rating may be based on ground truth data or previously observed map matching results. Ground truth data may be positional data and matched road segments that are matched with substantial accuracy. Ground truth data may include few to no matching errors. Ground truth data may be acquired by traveling a route and manually matching the positional data points. Other methods may be used to generate ground truth data. An ambiguity rating may be based on any measured errors between the ground truth matched data and data points matched with a simple map matching algorithm. For example, the number of positional points mismatched by the simple map matcher may be counted to determine the ambiguity.

In certain embodiments, the ambiguity rating may be connection based. In a connection based system, the ambiguity rating is based on simple traversal at each end of the segments. For example, if a vehicles was previously on segment A and now exits the end of the segment, the system may identify the probability that there are multiple segments to traverse for the next map match. A connection based system may be generated by calculating the number of connecting segments for each road segment and scoring the connections. Certain connections may be rated higher for ambiguity purposes. With only one connection, for example, the ambiguity rating may be low. With an off-ramp connection, the ambiguity rating may be high. A connection based ambiguity rating may be beneficial for map matching algorithms that use the prior segments as inputs for map matching. For example, a link A, might have three different ambiguity values if three different links (B, C, D) feed into the segment. When traveling from link B, the ambiguity might be 0.5, from C 0.9 and from D 0.3. This would mean a trajectory traveling from C to A would have a high degree of ambiguity compared to a traversal from D to A.

In certain embodiments, the ambiguity rating may be generated through proximity-network analysis. Proximity-network analysis may be performed using the identified road segment and neighbors (Acts A110 and A120). Using the road segment and the neighboring road segments, connections between the segments are identified. Ambiguity may increase when a vehicle might reach two different points by nearly the same path. For example, a point to map error is 10 m; when any two paths that are never more than 10 m apart and connect together at some point, there is a possible map-match ambiguity. Two paths that never connect may not be ambiguous regardless of how close the road segments are that make up the path. A map matching algorithm that excludes road segments that are not possible would not match to a non-connected road segment.

Figure 7A:
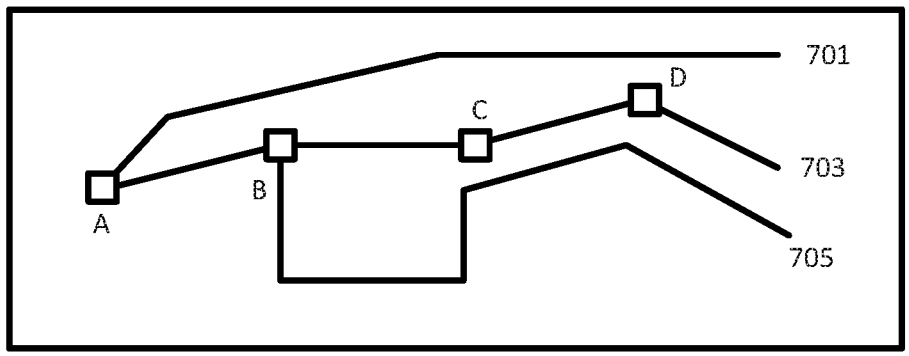
FIGS. 7A, 7B, 7C, and 7D illustrate an example of ambiguity ratings that are proximity and network based.

FIGS. 7A through 7D illustrate proximity generated ambiguity ratings. FIG. 7A illustrates three separate paths 701, 703, and 705. For the example, the main path 703 includes the nodes A, B, C, and D. Path 701 splits off from path 703 at point A, path 705 splits off from path 703 at point B.

Figure 7B:
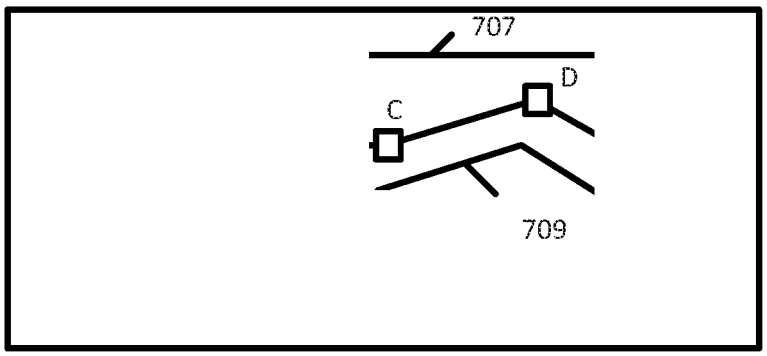
Figure 7C:
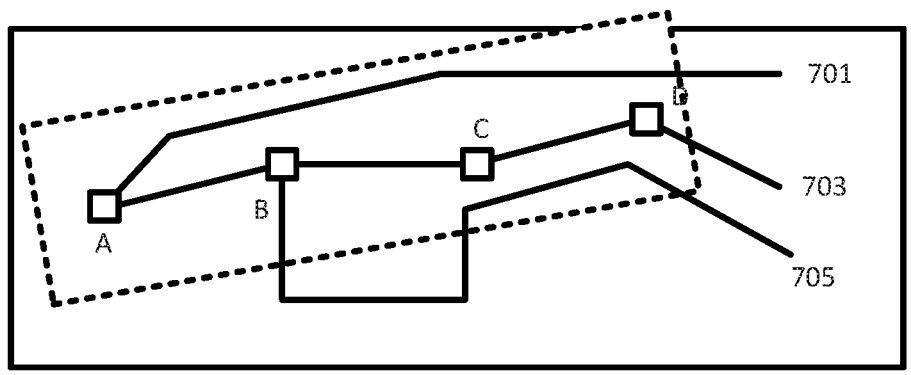
Figure 7D:
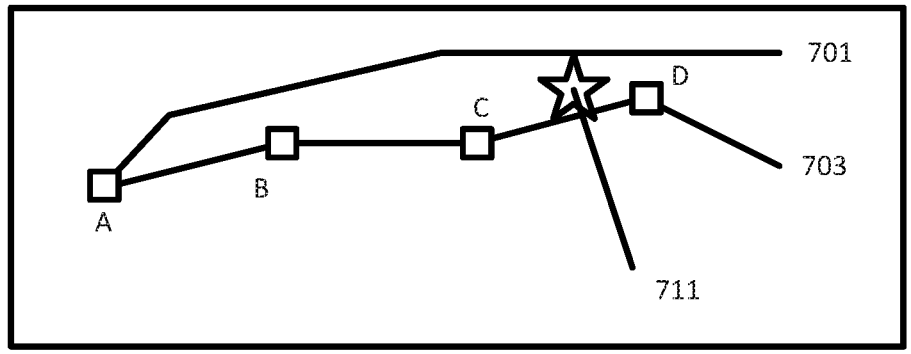

The server 125 starts at each segment and identifies nearby neighbors (Act A110 and A120). In FIG. 7B, there are two road segments 707 and 709 that are nearby segment CD. The server 125 crawls along both nearby segments 707 and 709 to identify ambiguous networks that never stray more than a threshold distance from each other. As shown in FIG. 7C by the dotted line (rough estimation of a threshold distance) traveling back along the path 701 never deviates more than a threshold distance. However, path 705 does deviate outside of the threshold distance. The server 125 crawls for a maximum travel distance along each network, or until the networks separate by more than some error tolerance. When a network connects back to the source segment, either path might be valid based on the GPS trace. From these possible paths, an ambiguity rating may be generated based on the possible errors. For example, in FIG. 7D, only segments in Path 701 or 703 are possible for the positional point 711. An ambiguity rating generating using the possible segments would not include the segments from path 705 and may assign a lower ambiguity rating than if the server 125 included path 705.

In certain embodiments, the ambiguity ratings may be based on the type of roadway configurations. For example, specific types of intersections or crossings may be assigned an ambiguity rating. Ambiguity ratings may be based on past performance for each type of roadway configuration. For example, a high ambiguity rating may be used for every off-ramp.

Each of the types of ambiguity ratings may be stored in the database 116. The server 125 may publish or make available the ambiguity ratings for others to use. The ambiguity ratings may be published as a map or presented as an attribute in a geographic database 116.

One use of ambiguity ratings is to identify an efficient map matching algorithm. The ambiguity ratings indicate the potential for map matching errors. The most common and simplest map matching is a single point mapped to the closest spatial segment. Just finding the nearest segment does not identify the confidence that the map match was correct; instead, the process might be required to continue to map to the previous and/or next N nearest segments to see if an ambiguous situation might exist. Further, the N nearest segments then need to be checked for proximity, heading angle, and network connectivity. These checks might be too computationally expensively to employ, especially for big data processes that map match billions of points to the map.

Figure 8:
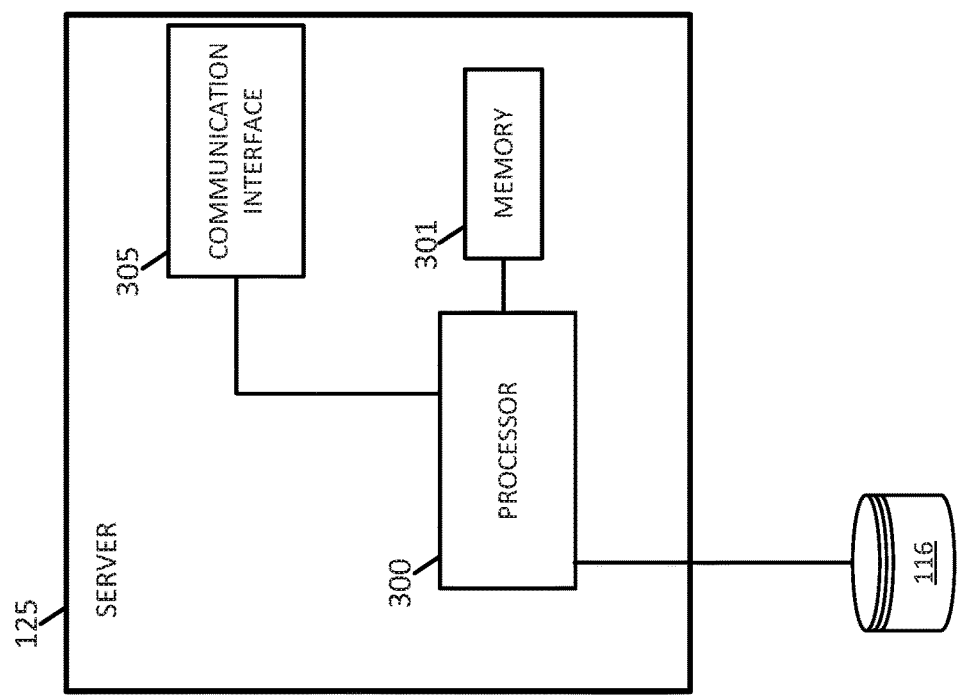
FIG. 8 illustrates an example server of FIG. 2.

FIG. 8 illustrates an example server 125 of the system of FIG. 1. The server 125 includes a processor 300 that is connected to a communications interface 305 and a memory 301. The processor 300 is also connected to the database 116. The communications interface 305 is configured to receive sensor data from one or more probes or devices 122. The memory 301 is configured to store received real-time and historical data. The processor is configured to generate an ambiguity rating for a road segment. The processor may be configured to select a map matching algorithm based on the ambiguity rating. The processor may be configured to generate maps and routing instructions. Additional, different, or fewer components may be included.

Figure 9:
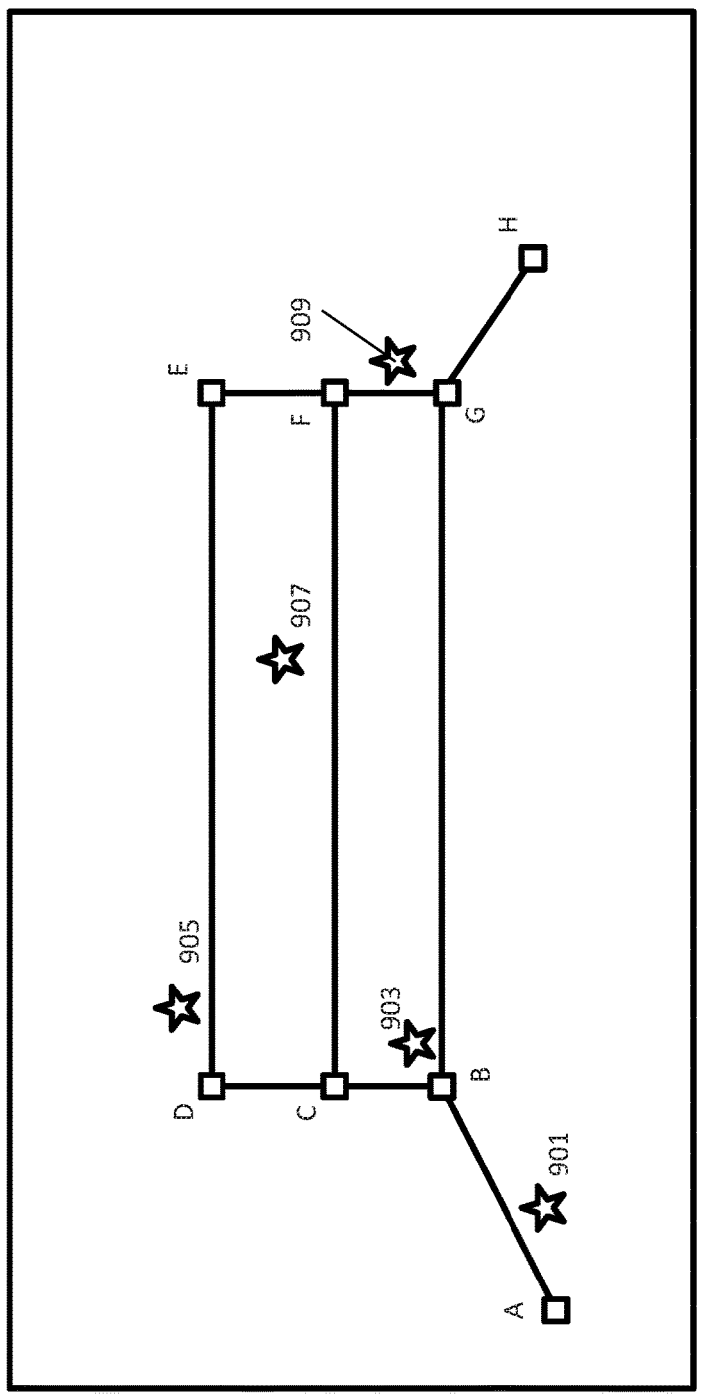
FIG. 9 illustrates an example flowchart for selecting map matching algorithms using the server of FIG. 8.

FIG. 9 illustrates an example flowchart for selecting a map matching algorithm using the server 125 of FIG. 2. As presented in the following sections, the acts may be performed using any combination of the components indicated in FIG. 2, FIG. 8, or FIG. 11. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, a positional data point is matched using a preliminary/first map matching algorithm. A positional data point may be derived from a GPS receiver. The positional data may be collected while traveling the route by a device 122. The device 122 may be, for example, a navigation system embedded in a vehicle or a mobile device. The location of a device 122 may be identified using positional circuitry such as a GPS receiver or other positional inputs. The device 122 may be configured to measure the position of the device 122 once a period as the device 122 travels from the starting point to a destination. For example, the device 122 may take positional measurement every 1 second (s), 2 s, 5 s, among other periods.

Figure 10:
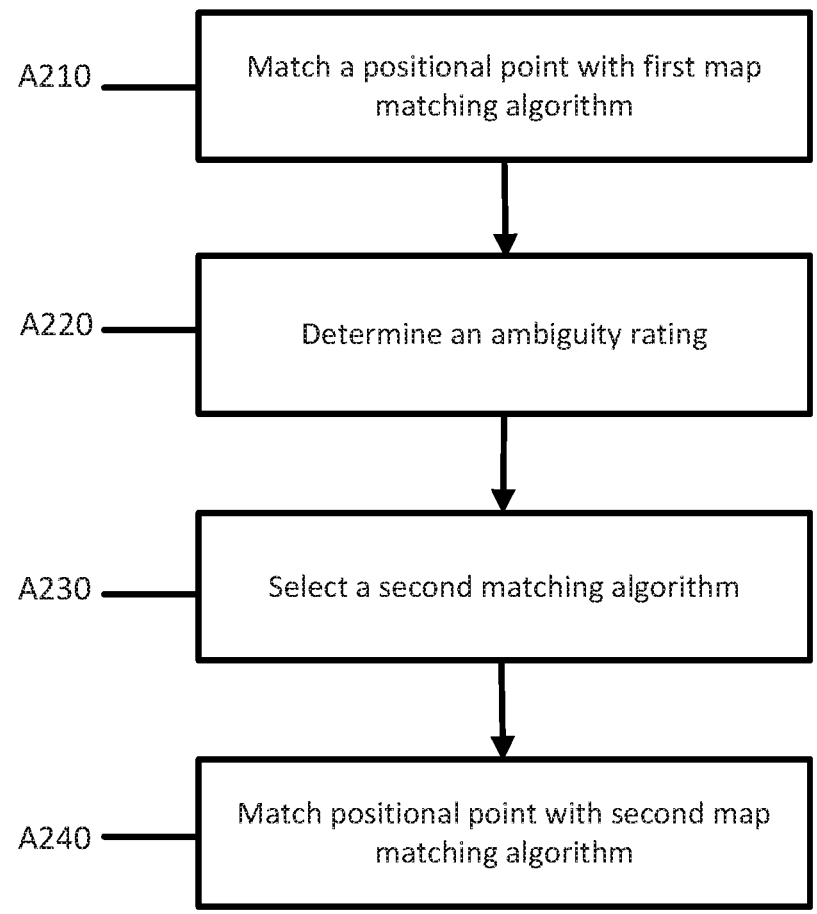
FIG. 10 illustrates an example roadway network.

FIG. 10 illustrates example positional data points in a roadway network. There are four positional data points 901, 903, 905, 907 and 909. The nodes are labeled A, B, C, D, E, F, G, and H. The road segments may correspond to the nodes; e.g. segment AB or segment BE. For the example, a device travels from A to H traveling through nodes A, B, C, D, E, F, G, and H in sequence.

A preliminary (for example, simple) map matching process matches the positional data point to the closest road segment. For many positional points, a simple map matching process may be sufficient as there may only be one potential road segment to match the positional point with. As shown in FIG. 10, the positional point 901 may be matched to segment AB by a simple map matching algorithm. In others scenarios, there may be multiple possible road segments to match the positional point with. As shown in FIG. 10, the positional point 903 may possible indicate that a vehicle is on road segment BC or BG (or even CF). Using a simple map matching algorithm (closest road segment), the positional point 903 is matched to road segment BG. Positional point 905 is matched to segment DE as the closest segment. Positional point 907 is matched to segment FC. Positional point 909 is matched to FG.

At act A220, an ambiguity rating for the road segment is determined. After the positional point has been matched to a road segment, the ambiguity of the road segment is determined. Alternatively the ambiguity might be found by looking up the current latitude, longitude, altitude using a grid based ambiguity map. Alternately, the previously map-matched segment might be used to lookup the ambiguity of the map-network's connected segments. An ambiguity rating may be stored in a geographic database 116 and may correspond to the road segment. As described in the flow chart in FIG. 3, an ambiguity rating may have been generated by scoring the relationships between the road segments and neighboring road segments. A road segment with multiple neighboring road segments may indicate that any positional data point matched to the road segment may be unclear. Certain relationships between segments, such as on-ramps, off-ramps, lanes, or parallel segments among others, may indicate a higher risk of ambiguity.

For the road segments in FIG. 10, the following ambiguity ratings may be used: AB=0.5; BC=1.5; CD=1.5; BG=3; CF=4; DE=2; EF=1.5; FG=2; GH=1. For these road segments the ambiguity ratings are based on a simple count of connected segments, parallel segments, and nearby segments. Each of these ratings may have been previously calculated and stored in the geographic database 116. Different types or sets of ambiguity ratings may be stored in the geographic database 116. Ambiguity ratings may be segment based, e.g. each segment may include an attribute for ambiguity. The ambiguity ratings may be grid based. The ambiguity may be connection based. Different methods for generating the value of the ambiguity may be used. The ambiguity rating for a road segment may be based on other attributes stored in a database 116 such as the number of lanes, curvature, road size, or road type among others.

In certain embodiments when using a grid based ambiguity rating, acts A210 and A220 may be skipped or curtailed. For example, a first map matching algorithm may not be used for a grid based ambiguity rating. The ambiguity rating may be determined directly from the positional data. For a grid based ambiguity rating, the positional data may be used to identify a geographic cell from a plurality of geographic cells. The plurality of cells may include an ambiguity rating (as illustrated by FIGS. 6A and 6B). The ambiguity ratings may indicate the ambiguity of the roadway network or may relate to specific types (e.g. simple or complex) or functionalities of map matching algorithms.

The ambiguity rating may identify specific algorithms to be used for a positional point in the geographic cell.

At act A230, a second (or secondary/subsequent) map matching algorithm is selected based on the ambiguity value. In certain embodiments, the first map matching algorithm used in act A210 is a simple map matching algorithm. The first map matching algorithm may only search for the closest road segment to the positional data point. Such an algorithm may be designed to be extremely quick and computationally cheap. However, a simple algorithm may not be sufficient to accurately match an ambiguous positional data point. Other map matching algorithms may use other inputs such as heading to improve the map matching process. Heading alone, however, may not be sufficient. A driven heading may not be aligned with the road network geometry (e.g. a 90 degree T intersection where a vehicle may take a curved route through the intersection). Further map matching algorithms may include a path history to improve the map matching process. Even with a more complex approach, there are many ambiguous situations where a confident answer is not possible (ramps, splits, multiple branching options).

For positional point 903 in FIG. 10, the preliminary/first map matching algorithm matched the positional point 903 to segment BG as BG is the spatially closest road segment. The ambiguity rating of segment BG is 3.0. In the example, a rating of 3.0 may indicate a low to medium ambiguity level. Using the ambiguity rating of 3.0, the server 125 may select a second map matching algorithm that may be efficient in map matching segments like segment BG (e.g. road segments with similar ambiguity ratings). Road segment BG does not have a high ambiguity rating, therefore a higher complexity map matching algorithm may not be selected. For the example, a map matching algorithm that uses heading may be selected. Such a map matching algorithm may be more accurate than a simple spatial distance algorithm, but still faster and more efficient than a very complex algorithm.

In another example, the first map matching algorithm may match positional data point 907 to segment CF. Because segment CF has a high ambiguity rating, the server 125 may select a complex map matching algorithm that uses both heading and prior segments. In another example, the server 125 may not select a second map matching algorithm for positional data point 901 or may select a simple map matching algorithm. Segment AB has a low ambiguity rating indicating that a simple map matching algorithm may be sufficient.

In certain embodiments, there may be multiple different map matching algorithms to select from. The different map matching algorithms may be stored in the device or accessed by using a navigation service. In one embodiment, the ambiguity value may specifically indicate which algorithm to use. For example, the ambiguity value may specify a specific algorithm. In another example, the map might contain a translation table indicating the threshold of each ambiguity rating. In another example, a user of the map may decide how best to translate the values into a map matching algorithm. The decision may be weighted based on the current vehicle's GPS accuracy, or quality of the positioning sensors. In certain embodiments, there may only be a simple or a complex map matching algorithm. The server 125 may set a threshold for the ambiguity; selecting the complex map matching algorithm for when the threshold is exceeded.

In certain embodiments, when using a grid based ambiguity rating, the second map matching algorithm may be the only map matching algorithm used. For example, an ambiguity rating is derived from the positional point by using a plurality of cell, each of which may include a respective ambiguity rating. At act A230, the ambiguity rating that relates to the geographic cell that contains the positional point is used to select the map matching algorithm.

At act A240, the positional point is matched using the second map matching algorithm. Depending on the complexity of the algorithm selected, different inputs may be used to match the positional point. In the examples used above, using the second map matching algorithm, positional point 903 is matched with segment CB, positional point 905 is matched with segment DE, positional point 901 is matched with segment AB, and positional point 907 is matched with segment DE. In act A210, positional point 903 was matched to segment BG using a simple map matching process. Due to the ambiguity of the segment, a second map matching algorithm was then selected. The second map matching algorithm using heading as an input matched positional point 903 to the correct segment BC. For positional points 901 and 905, the selected road segments are similar to act A210. For positional point 901, the first map matching algorithm selected segment AB. Segment AB is not ambiguous. As such, act A240 may be skipped. The second algorithm selected in act A230 may be the same algorithm as the first algorithm used in act A210. For positional point 905, the second map matching algorithm matched the same segment as the simple map matching algorithm. For positional point 907, the second map matching algorithm matches the positional point 907 to segment DE. The preliminary matched segment for positional point 907, CF had a high ambiguity rating. As such, the second map matching algorithm selected for positional point 907 may be a complex algorithm, taking into account both heading and prior segments. As DE was a prior segment and the vehicle is traveling in the direction from left to right, the proper selection would be segment DE.

In certain embodiments, the ambiguity rating may be representative of the confidence level for selecting a segment. In addition to outputting the matched segment from act A240, the ambiguity rating for the matched segment may also be transmitted or sent. In certain scenarios, even the most complex map matching algorithms may be incorrect. In other scenarios, even with a low ambiguity rating, there is still room for errors. A device 122 may be configured to use the ambiguity rating to alert a driver or take direct or indirect actions. For example, an autonomous driving vehicle may operate differently when the navigation device returns an ambiguous segment. Automated driving requires awareness of the map and even a slight error may be catastrophic.

As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

When an autonomous or highly automated driving vehicle receives an indication that the expected road segment is ambiguous or exceeds an ambiguity threshold, the vehicle may request driver assistance. The autonomous or highly automated driving vehicle may further weigh reading from other sensors in the vehicle more heavily as the road segment may be suspect.

Figure 11:
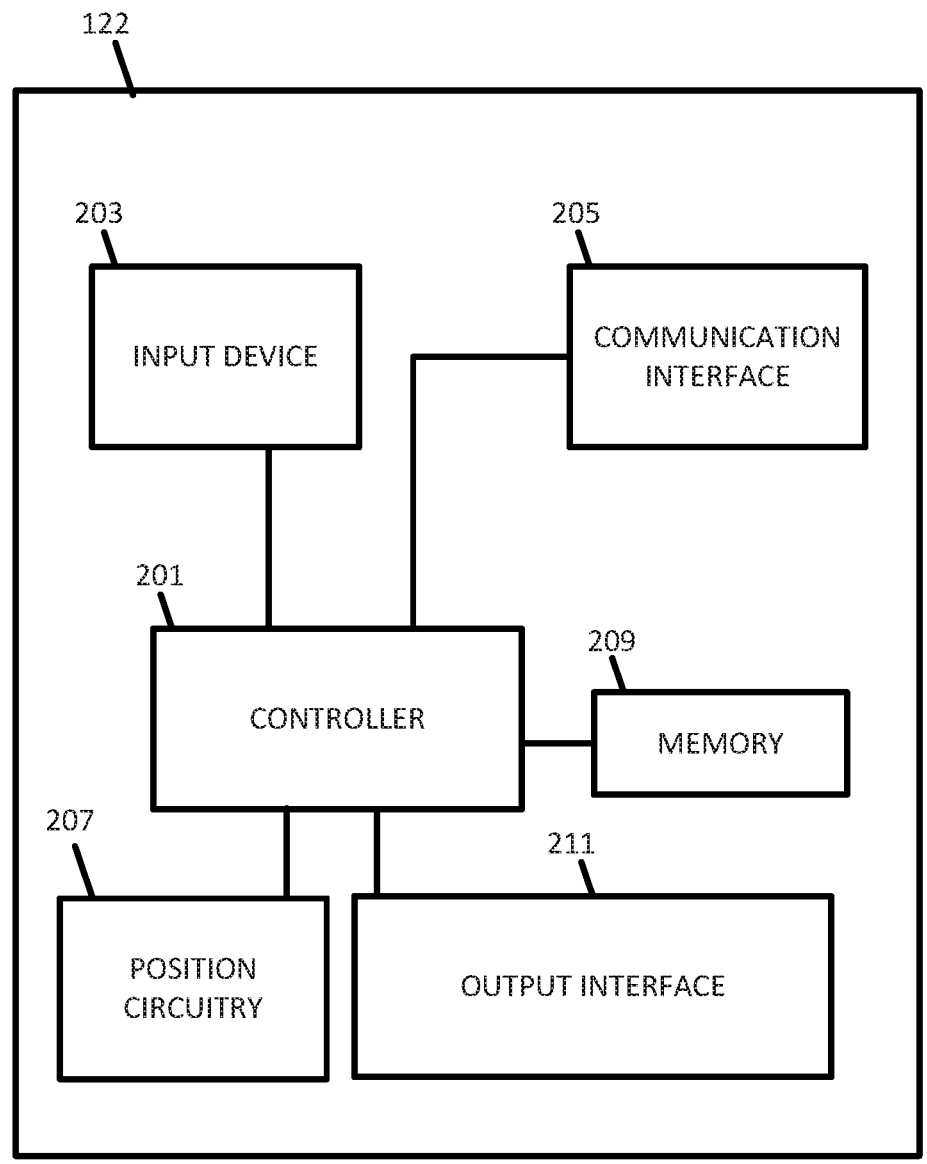
FIG. 11 illustrates an example device of the system of FIG. 2.

FIG. 11 illustrates an example device 122 of the system of FIG. 1. The device 122 may be configured to collect, transmit, receive, process, or display data. The device 122 may also be referred to as a probe 122, a mobile device 122 or a navigation device 122. The navigation device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

The device 122 may be configured to identify a positional point and to select a map matching algorithm to match to the positional point to a road segment. The device 122 may be configured to execute routing algorithms using a geographic database 116 to determine an optimum route to travel along a road network from an origin location to a destination location in a geographic region. Using input from an end user, the device 122 examines potential routes between the origin location and the destination location to determine the optimum route in light of user preferences or parameters. The device 122 may then provide the end user with information about the optimum route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on.

The navigation device 122 is configured to identify a starting location and a destination. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

A positional point may be identified using positional circuitry such as GPS or other positional inputs. The positioning circuitry 207, which is an example of a positioning system, is configured to determine a geographic position of the navigation device 122. The movement circuitry 208, which is an example a movement tracking system, is configured to determine movement of a navigation device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203. The navigation device 122 may identify its position as the device travels along a route using the positional circuity. For indoor spaces without GPS signals, the navigation device 122 may rely on other geolocations methods such as LIDAR, radar, Wi-Fi, beacons, landmark identification, inertial navigation (dead reckoning), among others.

The device 122 may store one or more map matching algorithms in memory. The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored geographic database 116 or link node routing graph. The locally stored geographic database 116 may be a copy of the geographic database 116 or may include a smaller piece. The locally stored geographic database 116 may use the same formatting and scheme as the geographic database 116. The navigation device 122 may determine a route or path from a received or locally geographic database 116 using the controller 200. The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing. The controller 200 may also include a decoder used to decode roadway messages and roadway locations.

The device 122 may store an ambiguity rating for one or more road segments in a geographic database 116 or a copy of a geographic database 116. The ambiguity rating may be stored as a road segment data record. The ambiguity rating may also be stored as a spatial grid of values in the database.

Figure 12:
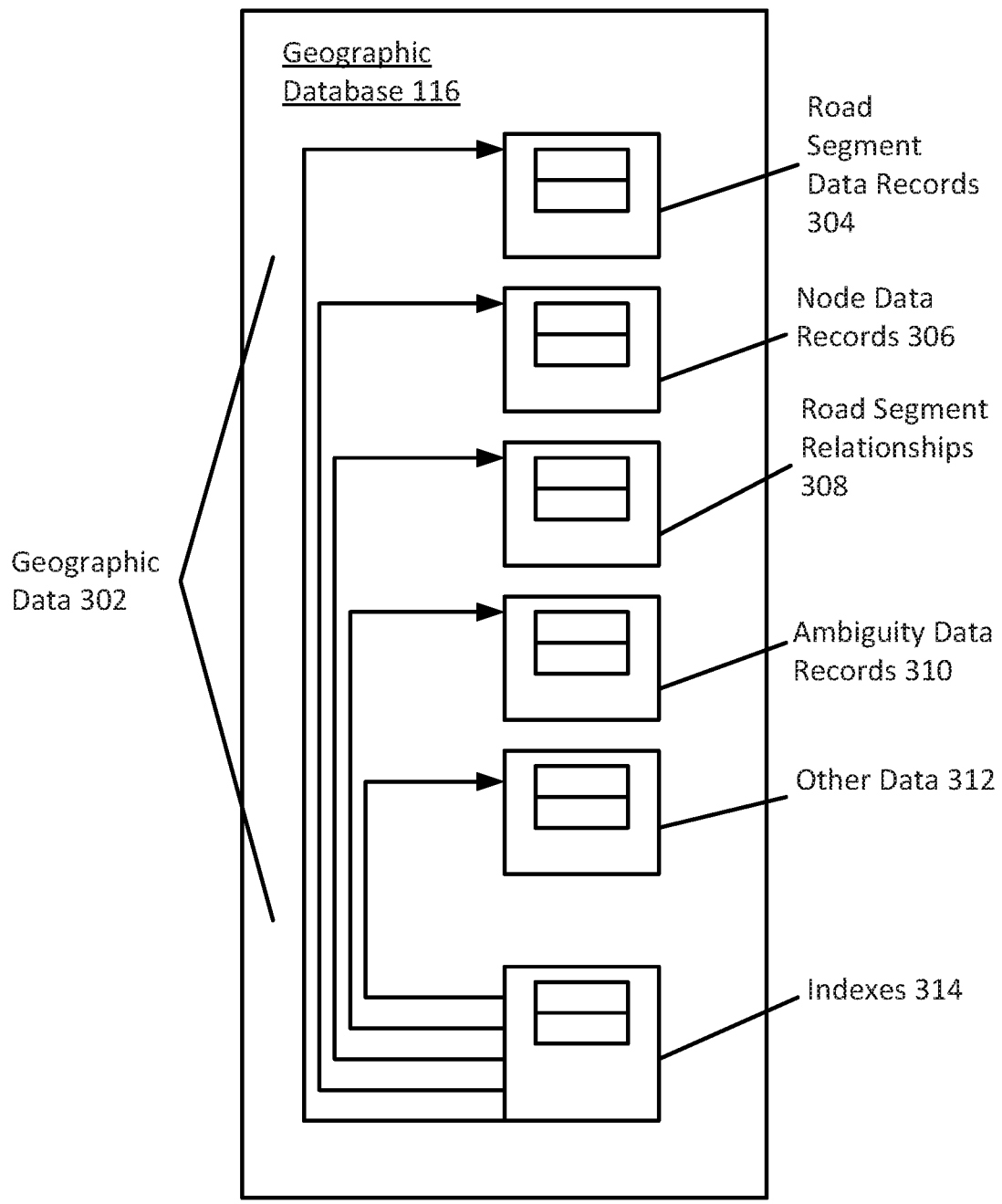
FIG. 12 illustrates example components of a geographic database.

FIG. 12 illustrates some of the components of a geographic database 116. In one embodiment, the geographic database 116 contains data 302 that represents some of the physical geographic features in the geographic region depicted in FIG. 1. The data 302 contained in the geographic database 116 may include data that represent the road network. In FIG. 12, the geographic database 116 that represents the geographic region may contain at least one road segment database record 304 (also referred to as "entity" or "entry") for each road segment in the geographic region. The geographic database 116 that represents the geographic region may also include a node database record

306 (or "entity" or "entry") for each node in the geographic region. The terms "nodes" and "segments" represent only one terminology for describing physical geographic features, and other terminology for describing features is intended to be encompassed within the scope of these concepts.

Figure 13:
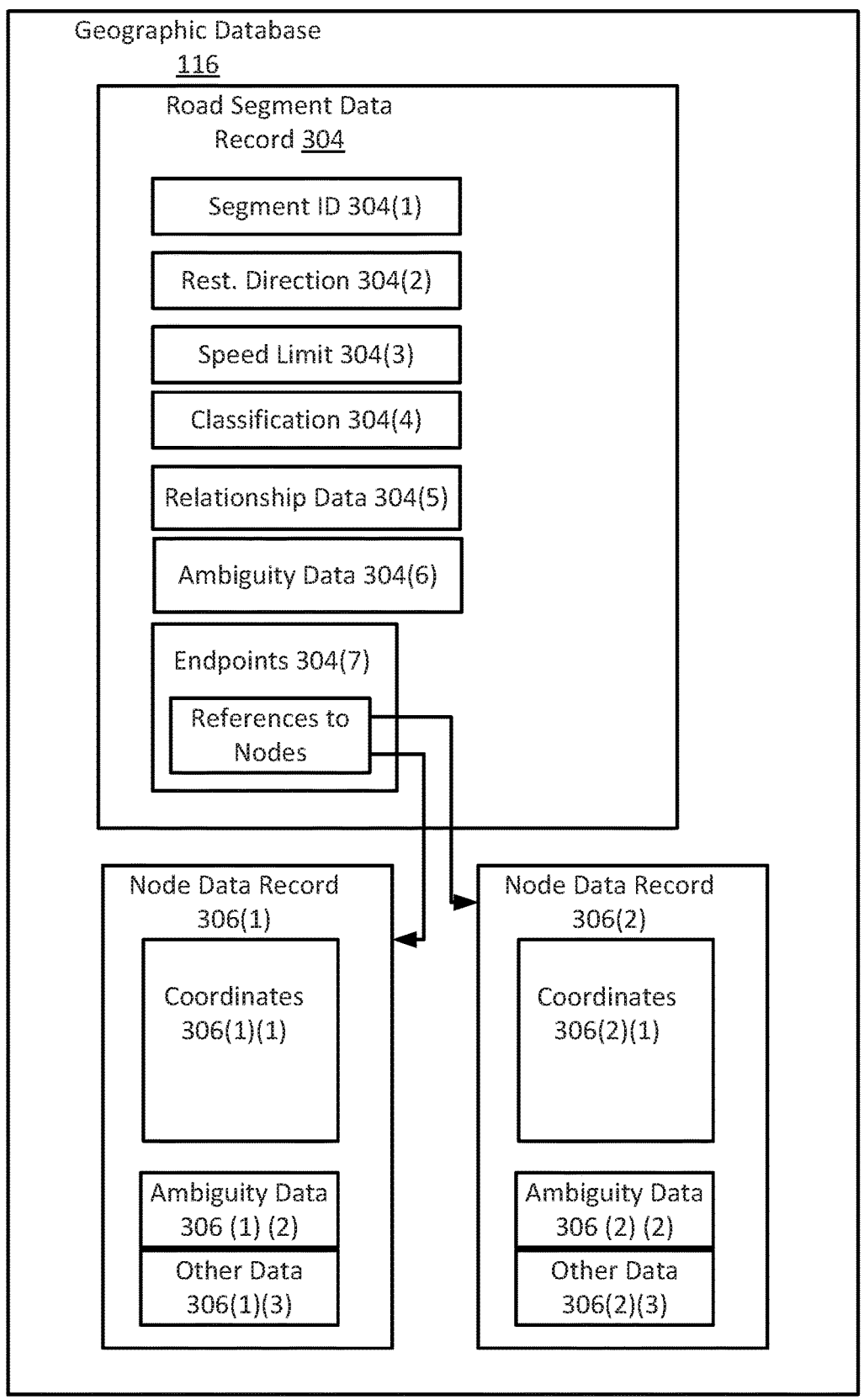
FIG. 13 illustrates example components of a road segment data record.

FIG. 13 illustrates some of the components of a road segment data record 304. The road segment data record 304 may include a segment ID 304(1) by which the data record may be identified in the geographic database 116. Each road segment data record 304 may have associated with the road segment data record 304 information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

Data for map matching ambiguity may be stored as separate records 308, 310 or in road segment data records 304. The geographic database 116 may include road segment data records 304 (or data entities) that describe features such as road segment ambiguity or positional ambiguity 304(6). An ambiguity rating may be stored as a field or record using a scale of values such as from 1 to 100 (1 being clear, 100 being very ambiguous). The ambiguity ratings may be stored using categories such as low, medium, high. The ambiguity rating may be stored as an identifier for a map matching algorithm or a type of map matching algorithm.

Additional schema may be used to describe the map matching ambiguity. The attribute data may be stored in relation to a link/segment 304, a node 306, a strand of segments, an area, or a region. The geographic database 116 may store information or settings for display preferences. The geographic database 116 may be coupled to a display. The display may be configured to display the roadway network and data entities using different colors or schemes. The geographic database 116 may store information relating to where hazardous conditions may exist, for example, though analysis of the data records and current/historical traffic conditions. Road segments with high ambiguity may be used to identify or supplement other data entities such as complex intersections for autonomous or HAD vehicles.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes that correspond to intersections at the ends of the road portion represented by the road segment, the name or names by which the represented road segment is known, the street address ranges along the represented road segment, and so on.

FIG. 13 depicts the components of a node data record 306 that may be contained in the geographic database 116. Each of the node data records 306 may have associated information (such as "attributes", "fields", etc.) that allows identification of the road segment(s) that connect to the road segment and/or the road segment's geographic position (e.g., its latitude and longitude coordinates). For the embodiment shown in FIG. 13, the node data records 306(1) and 306(2) include the latitude and longitude coordinates 306(1)(1) and 306(2)(1) for their node. The node data may include ambiguity data 306(1)(2) and 306(2)(2) that refers to ambiguity. For example, each node may include an ambiguity rating for each adjacent segment or an ambiguity rating for a cell in a grid based system. The node data records 306(1) and 306(2) may also include other data 306(1)(3) and 306(2)(3) that refer to various other attributes of the nodes.

The geographic database 116 may be stored all or in part on the device 122 or on the server 125. The geographic database 116 may be separate but connected to the device 122 and/or server 125.

The navigation device 122 is further configured to request a route from the starting location to the destination. The navigation device 122 may further request preferences or information for the route. The navigation device 122 may receive updated ambiguity ratings or maps from the server 125 e.g. for geographic regions including the route. The navigation device 122 may communicate with the server 125 or other navigational service using the communication interface 205. The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver/transmitter for digital radio signals or other broadcast mediums. A receiver/transmitter may be externally located from the device 122 such as in or on a vehicle.

The route and data associated with the route may be displayed using the output interface 211. The route may be displayed for example as a top down view or as an isometric projection. Road segments may be colored or shaded differently depending on the road segment's ambiguity. For example, an ambiguous road segment may be highlighted in yellow. As the device traverses the roadway and additional positional data points are collected, the ambiguity of the road segment may be diminished. In certain embodiments, an alert may be displayed or sounded if the vehicle is traveling on an ambiguous road segment.

In certain embodiments, the ambiguity ratings may be stored as a grid based map. A geographic region may be divided into cells. Each cell may be, for example, a 10 meter by 10 meter square. The cells may correspond to positional coordinates such as latitude and longitude. Each cell may be assigned or given an ambiguity rating. The ambiguity rating may be based on the number of road segments and alignment of the road segments in each cell. A map or database of the cell and ambiguity ratings may be stored in the device 122 or in the geographic database 116.

The device may be configured to identify a positional point using the positional circuitry such as a GPS receiver. The device looks up the cell in the grid based map that coincides with the positional point. The device may identify an ambiguity rating for the positional point. The ambiguity rating may be used to select from one or more map matching algorithm to be used to match the positional point. A positional point that is in a cell with only a single road path may use a simple map matching process. A point that is in a cell with a complex road segment arraignment may use, for example, a complex, path-based map matching algorithm. Other map matching algorithms may be used for different ambiguity ratings.

In certain embodiments, the ambiguity ratings may directly relate to a specific map matching algorithm. For example, an ambiguity rating of (1) may indicate a specific map matching algorithm, while an ambiguity rating of (2) may indicate a different map matching algorithm. The ambiguity ratings may not be an indication of the ambiguous nature of the cell, but rather an identifier for a type of map matching algorithm.

In certain embodiments, ambiguity rating may not be used to select a map matching algorithm, but rather to inform the navigational device. For example, a navigation device may only use a single map matching algorithm. The ambiguity rating may be used by the navigation device to identify a confidence level in the matched segment. In scenarios where the navigation device identifies map matched segments with a low confidence level (high ambiguity), the navigation device may alert a driver or autonomous system. For example, if the navigation device is not confident that the vehicle is on the correct road segment, the navigation device may recalculate the position of the vehicle using alternative inputs than the GPS coordinates. Tunnels, overpasses, segments with multiple lanes, off-ramps, and other roadway arraignments may not be well identified using a GPS receiver. The navigation device may also increase collection of GPS data when entering ambiguous cells. The navigation device may be configured to look ahead at the upcoming road segments and identify where the ambiguity rating are high or spike and take appropriate actions.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for conserving computational resources and time by determining when to use a less or more complex algorithm to map match a positional point to a road segment, the method comprising:
   identifying, by a processor, the road segment;
   identifying, by the processor, one or more neighboring road segments;
   determining, by the processor, a relationship between the road segment and the one or more neighboring road segments;
   and
   selecting, by the processor, a map matching algorithm from a plurality of potential map matching algorithms based on a complexity value of the relationship between the road segment and the one or more neighboring road segments, wherein a less complex map matching algorithm is selected over a more complex map matching algorithm for lower complexity values, wherein the plurality of potential map matching algorithms include map matching algorithms with a range of complexity, wherein the map matching algorithm is used to map match the positional point collected by a positioning sensor while a vehicle traverses a roadway network.

2. The method of claim 1, wherein the neighboring road segments are located within a threshold distance from the road segment.

3. The method of claim 1, further comprising:
   storing the complexity value as an attribute for the road segment in a map database that describes a geographic area.

4. The method of claim 1, wherein determining the relationship comprises:
   generating, by the processor, a score for each of the one or more neighboring road segments for a potential to be selected by one or more of the plurality of potential map matching algorithms.

5. The method of claim 1, further comprising:
   counting, by the processor, a number of adjacent neighboring road segments to the road segment for the complexity value.

6. The method of claim 1, wherein the complexity value includes a varying complexity value along a distance of the road segment.

7. The method of claim 1, wherein the complexity value comprises numerical data used to select inputs and complexity of the map matching algorithm to be used.

8. A method for limiting waste of resources and time by determining when to use a less or more complex algorithm to map match a positional point to a road segment, the method comprising:
   identifying, when traveling a roadway, the positional point of a vehicle;
   determining, by a processor, a complexity value stored in a map database, wherein the complexity value is associated with a first road segment or node thereof, wherein the complexity value describes a level of map matching complexity in the vicinity of the first road segment;
   identifying, by the processor, a level of computational complexity of map matching based on the complexity value;
   selecting, by the processor, a map matching algorithm from a plurality of potential map matching algorithms based on the complexity value, wherein a less complex map matching algorithm is selected over a more complex map matching algorithm for lower complexity values, wherein the map matching algorithm is equal to or exceeds the level of computational complexity; and
   map matching, by the processor, the positional point to a second road segment with the map matching algorithm.

9. The method of claim 8, wherein prior to determining the complexity value, the first road segment or node is identified using a preliminary map matching algorithm, wherein the map matching algorithm is a secondary map matching algorithm.

10. The method of claim 8, wherein the complexity value is derived from the first road segment and a relationship of the first road segment and one or more neighboring road segments.

11. The method of claim 8, wherein different values of the complexity value correspond to specific types of map matching algorithms.

12. The method of claim 9, wherein the preliminary map matching algorithm matches the first road segment to a closest spatial road segment.

13. The method of claim 12, wherein the map matching algorithm uses a heading as an input.

14. The method of claim 12, wherein the map matching algorithm uses one or more prior road segments as an input.

15. The method of claim 8, further comprising:
   determining, by the processor, a second complexity value for the second road segment;
   identifying, by the processor, a second level of computational complexity of map matching for the second complexity value;
   selecting, by the processor, a third map matching algorithm, wherein the third map matching algorithm is equal to or exceeds the second level of computational complexity; and
   map matching, by the processor, the positional point to a third road segment with the third map matching algorithm.

16. An apparatus for map matching a positional point to a road segment using a computationally appropriate map matching algorithm, the apparatus comprising:
- at least one processor; and
- at least one memory including computer program code for one or more programs; the at least one memory configured to store the computer program code configured to, with the at least one processor, cause the apparatus to at least perform:
- determine the positional point as a vehicle traverses a roadway network;
- identify, using the at least one processor, in a plurality of geographic cells stored in the at least one memory, a complexity value for a geographic cell of the plurality of geographic cells, wherein the complexity value describes a level of map matching computational complexity to be used when map matching in the geographic cell, wherein the geographic cell includes the positional point;
- select, using the at least one processor, a map matching algorithm from a plurality of potential map matching algorithms based on the complexity value, wherein the potential map matching algorithms include map matching algorithms with a range of computational complexity, wherein a less computationally complex map matching algorithm is selected as the map matching algorithm when the ambiguity rating is lower and a more computationally complex map matching algorithm is selected as the map matching algorithm when the complexity value is higher;
- map match, using the at least one processor, the positional point to the road segment using the map matching algorithm; and
- provide, the road segment as a location of the vehicle to an operator of the vehicle.

17. The apparatus of claim 16, wherein the complexity value is a function of a number of road segments in the geographic cell.

18. The apparatus of claim 16, wherein the complexity value is based on a number of parallel road segments in the geographic cell.

19. A computer-readable, non-transitory medium storing a program that causes a computer to execute a method for conserving computational resources of a navigation device by determining when to use a less or more complex algorithm to map match a positional point to a value for use in selecting a computationally efficient map matching algorithm when map matching a road segment, the method comprising:
- identifying one or more neighboring road segments in a predefined vicinity of the road segment;
- selecting a map matching algorithm from a plurality of potential map matching algorithms based on a complexity value of the relationship between the road segment and the one or more neighboring road segments, wherein a less complex map matching algorithm is selected over a more complex map matching algorithm for lower complexity values, wherein the plurality of potential map matching algorithms include map matching algorithms with a range of computational complexity;
- map matching using the selected map matching algorithm, the road segment and the positional point collected by a positioning sensor while a vehicle traverses a roadway network; and
- generating using the map matched positional point, a maneuver to be performed by the vehicle.

* * * * *